US006993557B1

(12) United States Patent
Yen

(10) Patent No.: US 6,993,557 B1
(45) Date of Patent: Jan. 31, 2006

(54) CREATION OF CUSTOMIZED WEB PAGES FOR USE IN A SYSTEM OF DYNAMIC TRADING OF KNOWLEDGE, GOODS AND SERVICES

(75) Inventor: Wei Yen, Los Altos Hills, CA (US)

(73) Assignee: BroadOn Communications Corp., Palo Alto, CA (US)

( * ) Notice: Subject to any disclaimer, the term of this patent is extended or adjusted under 35 U.S.C. 154(b) by 672 days.

(21) Appl. No.: 09/696,623

(22) Filed: Oct. 25, 2000

Related U.S. Application Data

(60) Provisional application No. 60/161,319, filed on Oct. 25, 1999.

(51) Int. Cl.
*G06F 15/16* (2006.01)

(52) U.S. Cl. ...................... 709/203; 709/217; 709/218; 709/219; 715/501.1; 707/9; 707/10; 707/102; 705/1; 705/26; 705/27

(58) Field of Classification Search ................ 709/203, 709/217–219; 715/501.1; 707/102, 9–10; 713/182, 4, 14, 26–30, 80; 705/4, 14, 26–30, 705/80, 1
See application file for complete search history.

(56) References Cited

U.S. PATENT DOCUMENTS

| | | | | |
|---|---|---|---|---|
| 5,983,227 | A * | 11/1999 | Nazem et al. | 707/10 |
| 6,219,680 | B1 * | 4/2001 | Bernardo et al. | 715/501.1 |
| 6,321,209 | B1 * | 11/2001 | Pasquali | 705/14 |
| 6,338,050 | B1 * | 1/2002 | Conklin et al. | 705/80 |
| 2002/0161673 | A1 * | 10/2002 | Lee et al. | 705/27 |

* cited by examiner

*Primary Examiner*—Kamini Shah
*Assistant Examiner*—Hieu Le
(74) *Attorney, Agent, or Firm*—Perkins Coie LLP

(57) ABSTRACT

The invention provides a method and system for creating and customizing a home page that is used in conjunction with a technique for dynamically trading knowledge and services. A provider of knowledge, goods or services could request a home page on a web site dedicated to dynamically providing goods and services. Upon receiving the request, the provider of knowledge, goods or services is given the opportunity to create a specially customized home page. This homepage provides prospective buyers, with some or all of the following information: the name of the provider, the type of product, the amount of product available, a way of categorizing the product, a description, a fixed price, optional goods or services and other related information that would be helpful to those trying to identify providers of good and services and select among them. A provider of goods and services is guided through a step-by-step procedure, during which the provider is presented with a number of mandatory information fields that are used in creating a customized home page.

2 Claims, 3 Drawing Sheets

CREATION OF CUSTOMIZED WEB PAGES FOR USE IN A SYSTEM OF DYNAMIC TRADING OF KNOWLEDGE, GOODS AND SERVICES

This application claims the benefit of U.S. Provisional Application No. 60/161,319 filed Oct. 25, 1999.

BACKGROUND OF THE INVENTION

1. Field of the Invention

This invention relates to the creation of home pages to be used in an internetworking system for dynamic trading of knowledge and services.

2. Related Art

One aspect of the Internet that has become popular is the use of web pages to advertise goods and services to a wide audience.

One problem in the known art occurs when a provider of goods and services is not knowledgeable in the art of creating a web page "from scratch". Although such providers can call upon the services of special web page designers or use software that assists in the creation of the web pages, the providers may lack the information necessary to evaluate such services, use complex software or make the artistic and marketing decisions relating to what information they wish a prospective buyer to view.

A second problem in the known art occurs when a provider of good or services puts their web pages on-line. Even if the web page describes the goods and services and informs the seeker of such goods or services how to contact the provider, a party seeking such goods and services would have to find the web page, often engaging in a relatively tiresome procedure of eliminating products and services that are irrelevant to his search.

Accordingly, it would be advantageous to provide an enabling technology whereby the provider of knowledge, services or goods can easily create a home page that provides information about his business and display the home page at a commercial site that is dedicated to the dynamic trade of goods and services. This enabling technology guides the provider through a step-by-step procedure to create a home page. During this procedure, the provider makes choices concerning what type of information to display and how best to display it. The resulting customized home page is then displayed at a central site so that persons seeking goods or services can evaluate what is offered and contact the provider.

SUMMARY OF THE INVENTION

The invention provides a method and system for creating and customizing a home page that is used in conjunction with a technique for dynamically trading knowledge and services.

A provider of knowledge, goods or services contacts a web site and requests a web page on a web site dedicated to dynamically providing goods and services.

In response to the request, the web site allows the provider of knowledge, goods or services an opportunity to interact with a computer program to create a specially customized web page.

The computer program guides the provider of knowledge, goods or services through a step-by-step procedure, during which the provider is presented with a number of mandatory information fields that are used in the creation of a customized home page. In addition to including the mandatory fields, the customized home page could include a number of optional fields that would better highlight the goods and services. For examle, the provider could decide to

- display optional fields in his home page (in addition to the mandatory ones);
- create and display several different types of fields, including drop-down menus, check boxes, radio groups, text labels, scrolling text boxes and text boxes;
- create and save forms that can be attached to each service provided (for example, order forms, customer identification forms and credit history forms); and
- create and display multiple services in a single home page.

The resulting web page provides prospective clients with some or all of the following information: the name of the provider, the type of product, the amount of product available, a way of categorizing the product, a description, a fixed price, optional goods or services and other related information that would be helpful to those trying to identify providers of good and services and select among them.

In a preferred embodiment, the web page is displayed on a particular web site, along with other web pages created by other providers of knowledge, goods or services. This central location, as it were, eliminates problems associated with searching for particular products or vendors on line. Instead of sorting through results gathered by a search engine, clients can go directly to the centralized site.

DETAILED DESCRIPTION OF THE PREFERRED EMBODIMENT

In the following description, a preferred embodiment of the invention is described with regarded to preferred process steps and data structures. Embodiments of the invention can be implemented using general-purpose processors or special purpose processors operating under program control, or other circuits adapted to particular process steps and data structures described herein. Implementation of the process steps and structures described herein would not require undue experimentation or further invention.

System Elements

Figure 1:
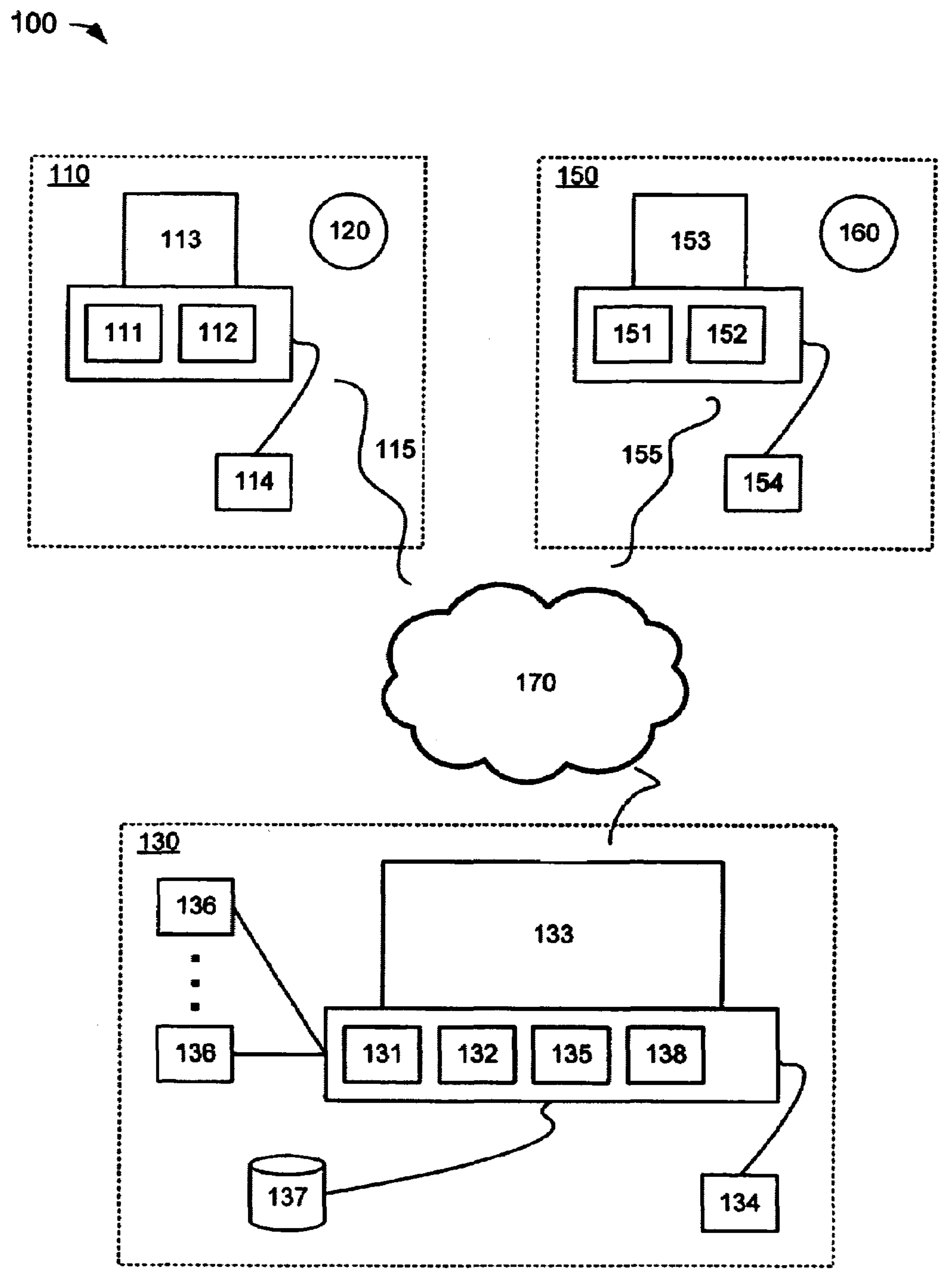
FIG. 1 is a block diagram that shows an apparatus for creating a web page that can be used in a system for dynamically trading information, goods, and services.

FIG. 1 is a block diagram that shows an apparatus for creating a web page that can be used in a system for dynamically trading information, goods and services.

A system 100 includes at least one first client device 110 under the control of a provider of knowledge, goods or services 120, at least one server device 130 that displays a plurality of web pages 140, at least one second client device 150 under the control of the end user 160, and a communications network 170.

The first client device 110 is under the control of a provider of knowledge, goods or services 120 who is interested in creating and displaying a web page 140. The client workstation 110 includes a computer having a processor 111, a memory or mass storage 112, a presentation element 113, an input element 114, and a network connection 115 that may be coupled to the communications network 170. As used herein, the term "computer" is intended in its broadest sense, and includes any device having a programmable processor or otherwise falling within the generalized Turing machine paradigm.

Similar to the first client device 110, the second client device 150 also includes a computer having a processor 151, a memory or mass storage 152, a presentation element 153, an input element 154, and a network connection 155. However, the second client device 150 can be under the control of an end user 160. In a preferred embodiment, the end user 160 is navigating a communications network 170 in search of particular knowledge, goods or services.

The server device 130 includes at least one computer having a processor 131, a memory or mass storage 132, a presentation element 133 and an input element 134. The server 130 also includes a computer program 135 for generation of web pages 140, one or more web sites 136 for displaying web pages 140 that are created using the computer program 135, a database 137, and web server software 138.

Although described as a single entity, the server 130 may include multiple servers, so that the computer program 135 for generation of web pages 140 and the one or more web sites 136 and the database 137 may reside (collectively or as single entities) in a single memory 132 or in different memories 132 spanning several different servers 130. Like the client workstation 110, the server 130 is coupled to the communication network 170. As used herein, the term "computer" is intended in its broadest sense, and includes any device having a programmable processor or otherwise falling within the generalized Turing machine paradigm.

In a preferred embodiment, the provider of knowledge, goods or services 120 uses their associated client device 110 and the communications network 170 to log on to a web site associated with the server device 130 and interact with the computer program 135 to generate a web page 140.

The computer program 135 a set of instructions that govern interactions between the provider 120 and the server 130. These instructions include requesting specific demographic information 141 about the provider of knowledge, goods or services 120 and the type of business or organization on whose behalf the web page 140 is being generated. In addition to providing information for billing purposes, this demographic information 141 may be used to suggest where the web page 140 should be displayed. In a first example, if the provider 120 identifies themselves as a school, then the web page 140 might be displayed with web pages 140 from other schools. In a second example, if the provider 120 identifies themselves as a car retailer, then the web page 140 might be displayed with web pages 140 from other car dealers.

The demographic data 141 includes some or all or some combination of the following:

- the name of the provider 120, assorted contact information and credit card information
- the type of product
- the amount of product available
- a way of categorizing the product, service or knowledge
- a description of the product
- a fixed price, optional goods or services and other related information that would be helpful to those trying to identify providers of goods and services 120 and select among them.

After acquiring this demographic information 141, the computer program 135 includes an instruction to present the providers of knowledge good or services 120 with a step-wise sequence of choices 142, relating to the types of content that are to be displayed on the web page 140 and how that content is to be displayed. This step-wise sequence of choices 142 may include some or all or some combination of the following:

- text fields to be displayed on a web page 140
- fonts for text fields
- size of text to be included in a text field
- "wallpaper" styles
- links to other sites
- fields for graphics (for example, fields for showing photographs of a product)
- fields for streaming media (for example, sound sampling, video snips)
- design elements to be included in a page (for example, the provider 120 may chose
- from a collection of different graphical images)
- display optional fields in a web page (in addition to the mandatory ones)
- select from different types of fields, including drop-down menus, check boxes, radio groups, text labels, scrolling text boxes and text boxes
- create and save forms that can be attached to each service provided (for example, order forms, customer identification forms and credit history forms)
- create and display multiple services in a single web page.
- other graphic tools, such as a tool to move elements included on a page.

The one or more web sites 136 include centralized locations on a network for the display of web pages 140. Each web site 136 includes a plurality of web pages 140, or links to web pages 140, so as to organize the web pages 140 in a way as to make them more accessible to an end user 160. These one or more web sites 136 relieve the end user 160 from problems associated with finding information on a network (for example, reviewing search engine results).

In a preferred embodiment, a particular web page 140 may be displayed at one or more of the web sites 136. For example, if a web page 140 is generated by a medical school and contains information about a particular disease, the web page 140 may be displayed on a web site 136 devoted to medical schools and a web site 136 devotes to health concerns. In a preferred embodiment, each web page 140 is the home page for the provider 120 so that a particular web site 136 contains a cluster of home pages or links to home pages.

The database 137 includes a file 138 for each provider of knowledge, goods or services 120. The file 138 contains all of the demographic data 141, drafts of web pages 140 created by the provider 120, and information related to the web pages 140 created by the provider 120 such as the number of "hits" in a particular time period.

Web server software 138 includes a computer program for displaying the web site 136 and the web pages 140 on a network using the server device 130.

In a preferred embodiment, the communications network 170 includes the Internet. However, it may also include any other type of computer network, such as an intranet, extranet or a virtual private network. Communications over this communication network may involve any number or combination of technologies such a direct communication line, a switched network such as a telephone network, a wireless network, a form of packet transmission or some combination thereof. All variations of communication links noted herein are known in the art of computer communication.

Figure 2A:
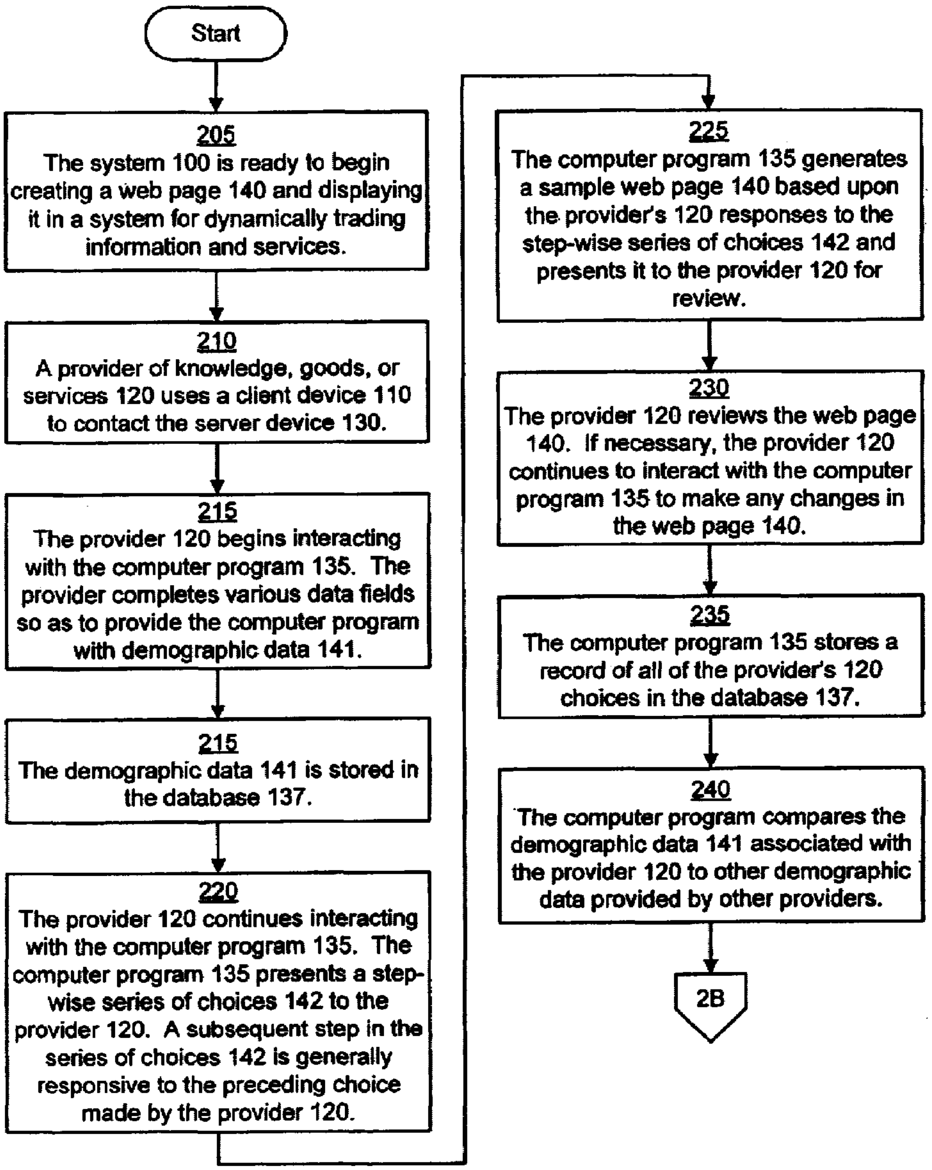
FIGS. 2A and 2B are a flow chart that shows a method for creating a web page and displaying it in a system for dynamically trading information, goods, and services.
Figure 2B:
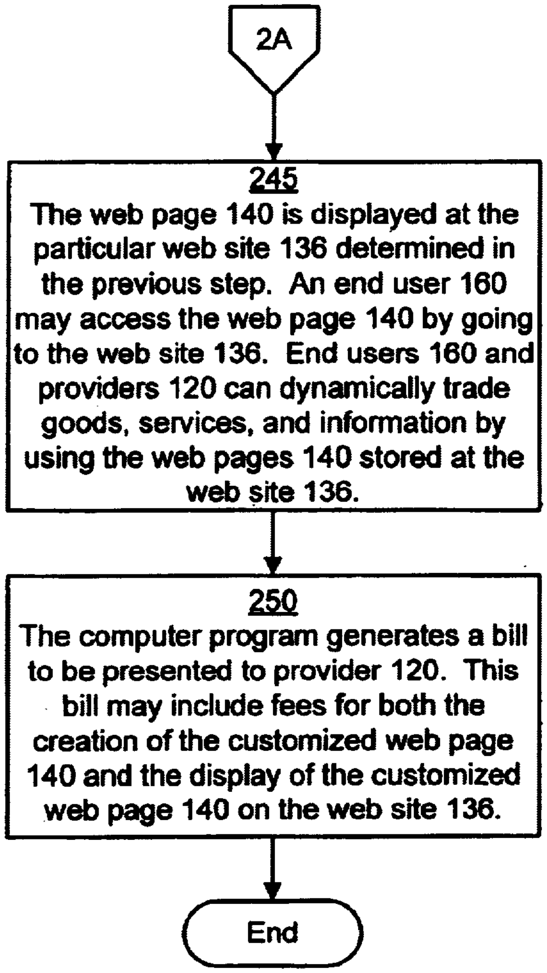

FIGS. 2A and 2B are flow charts that show a method for creating a web page and displaying it in a system for dynamically trading information and services.

The method 200 is performed by the system 100. Although the method 200 is described serially, the steps of the method 200 can be performed by separate elements in conjunction or parallel, whether asynchronously, in a pipelined manner, or otherwise. There is no particular requirement that the method 200 be performed in the same order in which this description lists the steps, except where so indicated.

At a flow point 205, the system 100 is ready to begin creating a web page 140 and displaying it in a system for dynamically trading information and services.

At a flow point 210, a provider of knowledge, goods or services 120 uses a client device 110 to contact the server device 130.

At a flow point 215, the provider 120 begins interacting with the computer program 135. The provider completes various data fields so as to provide the computer program with demographic data 141. This demographic data can include some or all or some combination of the following:

- the name of the provider 120, assorted contact information and credit card information
- the type of product
- the amount of product available
- a way of categorizing the product, service or knowledge
- a description of the product
- a fixed price
- optional goods or services and other related information that would be helpful to end users 160 who are trying to identify providers of goods and services 120 and select among them.

In a step 215, the demographic data 141 is stored in the database 137.

In a step 220, the provider 120 continues interacting with the computer program 135. The computer program 135 presents a step-wise series of choices 142 to the provider 120. A subsequent step in the series of choices 142 is generally responsive to the preceding choice made by the provider 120. For example, if a provider 120 selects "pull-down menus", the next step in the series of choices may involve completion of text fields included in the pull-down menu.

These series of choices 142 may include some or all or some combination of the following:

- text fields to be displayed on a page
- fonts for text fields
- size of text to be included in a text field
- "wallpaper" styles
- links to other sites
- fields for graphics (for example, fields for showing photographs of a product)
- fields for streaming media (for example, sound sampling, video snips)
- design elements to be included in a web page 140 (for example, the provider 120 may chose from a collection of different graphical images)
- optional fields in a web page (in addition to the mandatory ones)
- different types of fields, including drop-down menus, check boxes, radio groups, text labels, scrolling text boxes and text boxes
- forms that can be attached to each service provided (for example, order forms, customer identification forms and credit history forms)
- multiple services in a single web page.
- other graphic tools, such as a tool to move elements included on a page.

In a step 225, the computer program 135 generates a sample web page 140 based upon the provider's 120 responses to the step-wise series of choices 142 and presents it to the provider 120 for review.

In a step 230, the provider 120 reviews the web page 140. If necessary, the provider 120 continues to interact with the computer program 135 to make any changes in the web page 140. Steps 225 and 230 may be repeated until such time that the provider 120 believes that the web page 140 is complete.

In a step 235, the computer program 135 stores a record of all of the provider's 120 choices in the database 137.

In a preferred embodiment, the preceding steps may take place in a single session or in multiple sessions. If they take place in multiple sessions, the results of each session are stored in the database 137 at the end of that particular session and retrieved from the database 137 at the start of the next session.

In a step 240, the computer program compares the demographic data 141 associated with the provider 120 to other demographic data provided by other providers. This comparison is used to determine a particular web site 136 where the web page 140 will be displayed. Generally, the choice is made upon commonality of specific demographic information, such as type of business, type of content, geographic location and other factors.

In a step 245, the web page 140 is displayed at the particular web site 136 determined in the previous step. An end user 160 may access the web page 140 by going to the web site 136. End users 160 and providers 120 can dynamically trade goods, services and information by using the web pages 140 stored at the web site 136.

In a step 250, the computer program generates a bill to be presented to provider 120. This bill may include fees for both the creation of the customized web page 140 and the display of the customized web page 140 on the web site 136.

Alternative Embodiments

Although preferred embodiments are disclosed herein, many variations are possible which remain within the concept, scope and spirit of the invention and these variations would become clear to those skilled in the art after perusal of this application.

What is claimed is:

1. An apparatus, including at least one client device under the control of a provider who wishes to create a web page that is used in a dynamic system for trading goods and services;

at least one server device that can be accessed by said client device;

a memory coupled to said server device, wherein said memory includes a computer program providing an interactive set of instructions for generation of web pages and determination of at least one web site;

a database coupled to said server device, wherein said database includes at least one record regarding a provider wherein said at least one record is entered by said provider;

at least one web site wherein said web pages are displayed;

a communication link;

said set of instructions including an instruction to present a query to said client device for demographic information;

an instruction to receive said demographic information from said client device and store said demographic information said database;

an instruction to provide a set of interactive steps to said client device;

an instruction to receive a response from said client device to said set of interactive steps, wherein said interactive steps are responsive to feedback from said client device;

an instruction to store said feedback in said database;

an instruction to generate said web page based upon said feedback;

an instruction to compare said demographic information;

an instruction to associate the results of said instruction to compare with a web site;

an instruction to display said web page at said web site; and an instruction to charge said provider a fee.

2. An apparatus, including at least one client device under the control of a provider who wishes to create a web page that is used in a dynamic system for trading goods and services;

at least one server device that can be accessed by said client device;

a memory coupled to said server device, wherein said memory includes a computer program providing an interactive set of instructions for generation of web pages and determination of at least one web site;

a database coupled to said server device, wherein said database includes at least one record regarding a provider wherein said at least on record is entered by said provider;

at least one web site wherein said web pages are displayed;

a communication link;

said set of instructions including an instruction to present a query to said client device for demographic information;

an instruction to receive said demographic information from said client device and store said demographic information said database;

an instruction to provide a set of interactive steps to said client device;

an instruction to receive a response from said client device to said set of interactive steps, wherein said interactive steps are responsive to feedback from said client device including one or more interactive steps involving compositional elements for inclusion in said web page;

an instruction to store said feedback in said database;

an instruction to generate said web page based upon said feedback;

an instruction to compare said demographic information;

an instruction to associate the results of said instruction to compare with a web site;

an instruction to display said web page at said web site; and an instruction to charge said provider a fee.

* * * * *